US011189106B2

(12) United States Patent
Zavesky et al.

(10) Patent No.: US 11,189,106 B2
(45) Date of Patent: Nov. 30, 2021

(54) SYSTEMS AND METHODS FOR SPATIAL REMODELING IN EXTENDED REALITY

(71) Applicant: AT&T Intellectual Property I, L.P., Atlanta, GA (US)

(72) Inventors: Eric Zavesky, Austin, TX (US); Jean-Francois Paiement, Sausalito, CA (US); Tan Xu, Bridgewater, NJ (US); David Crawford Gibbon, Lincroft, NJ (US); Jianxiong Dong, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/859,709

(22) Filed: Apr. 27, 2020

(65) Prior Publication Data

US 2021/0335050 A1 Oct. 28, 2021

(51) Int. Cl.
*G06T 19/20* (2011.01)
*G06Q 30/02* (2012.01)
(Continued)

(52) U.S. Cl.
CPC .............. *G06T 19/20* (2013.01); *G06F 30/13* (2020.01); *G06K 9/00671* (2013.01);
(Continued)

(58) Field of Classification Search
None
See application file for complete search history.

(56) References Cited

U.S. PATENT DOCUMENTS 10,332,138 B1 6/2019 Bruce et al.
2016/0048934 A1* 2/2016 Gross ................... G06K 9/4642
705/313
(Continued)

OTHER PUBLICATIONS

Nauata, Nelson, et al. "House-GAN: Relational Generative Adversarial Networks for Graph-constrained House Layout Generation." arXiv preprint arXiv:2003.06988 (2020).*
(Continued)

*Primary Examiner* — Ryan M Gray
(74) *Attorney, Agent, or Firm* — Guntin & Gust, PLC; Matthew Tropper

(57) ABSTRACT

Aspects of the subject disclosure may include, for example, storing, in a database, a decorating style preference of a user; receiving, from user equipment of the user, one or more images (and/or one or more 2D environment models and/or one or more 3D environment models) depicting an environment in which remodeling is desired; generating, via a machine learning process, a first model to present by the user equipment, the generating the first model being based upon the decorating style preference and the one or more images (and/or the one or more 2D environment models and/or the one or more 3D environment models), the first model comprising a first remodeling proposal for the environment; sending, to the user equipment, the first model, the sending of the first model facilitating display by the user equipment of a first depiction of the environment as proposed by the first remodeling proposal; receiving, from the user equipment, feedback information regarding the first remodeling proposal; generating, via the machine learning process, a second model to present by the user equipment, the generating the second model being based upon the decorating style preference, the one or more images (and/or the one or more 2D environment models and/or the one or more 3D environment models), and the feedback information, the
(Continued)

second model comprising a second remodeling proposal for the environment; and sending, to the user equipment, the second model, the sending of the second model facilitating display by the user equipment of a second depiction of the environment as proposed by the second remodeling proposal. Other embodiments are disclosed.

20 Claims, 10 Drawing Sheets

(51) Int. Cl.
| | | |
|---|---|---|
| *G06Q 30/06* | (2012.01) | |
| *G06K 9/00* | (2006.01) | |
| *G06F 30/13* | (2020.01) | |
| *G06N 20/00* | (2019.01) | |
| *G06T 7/73* | (2017.01) | |
| *G06F 111/18* | (2020.01) | |

(52) U.S. Cl.
CPC ......... *G06N 20/00* (2019.01); *G06Q 30/0275* (2013.01); *G06Q 30/0643* (2013.01); *G06T 7/75* (2017.01); *G06F 2111/18* (2020.01)

(56) References Cited

U.S. PATENT DOCUMENTS

2018/0336732 A1* 11/2018 Schuster ........ G06Q 10/063118
2021/0082189 A1* 3/2021 Jovanovic ............. G06T 19/006

OTHER PUBLICATIONS

Wang, Xiaolong, and Abhinav Gupta. "Generative image modeling using style and structure adversarial networks." European conference on computer vision. Springer, Cham, 2016.*
Zhang, Hang. "3D Architectural Form Style Transfer through Machine Learning (Full Version)."*
Kelly, Tom, et al. "FrankenGAN: guided detail synthesis for building mass-models using style-synchonized GANs." arXiv preprint arXiv:1806.07179 (2018).*
"3D Capture Platform for Real Estate", https://matterport.com/real-estate-agents/, Nov. 27, 2019, 13pgs.
"3D Capture Platform for Real Estate | Matterport", https://matterport.com/industries/real-estate, 2020, 14 pgs.
"Deepfake", Wikipedia, Deepfake, Oct. 8, 2020, 16 bpages, Oct. 8, 2020, 16 pgs.
"Deepfake Wikipedia", https://web.archive.Org/web/20200423215151/https://en.wikipedia.org/wiki/Deepfake, Apr. 22, 2020, 14 pgs.
"Digital Twin Wikipedia", https://web.archive.Org/web/20200303161906/https://en.wikipedia.org/wiki/Digital_twin, Mar. 3, 2020, 17 pages.
"GAF Remodeler on the App Store", https://apps.apple.com/us/app/gaf-remodeler/id585649569, 20218, 3 pgs.
"GAF Remodeler On The App Store—History", https://apps.apple.com/us/app/gaf-remodeler/id585649569, 2018, 3 pgs.
"GAN—Some cool applications of GAN", https://jonathan-hui.medium.com/gan-some-cool-applications-of-gans-4c9ecca35900, Jun. 22, 2018, 31.
"Gan Variations", https://developers.google.com/machine-learning/gan/applications, Apr. 28, 2019, 5.
"Home Design 3D", https://store.steampowered.com/app/420000/Home Design_3D/, Nov. 27, 2019, 4pgs.
"Home Design 3D on Steam", https://web.archive.org/web/20190416050107/https://store.steampowered.com/app/420000/Home_Design_3D/, Apr. 16, 2019, 5 pgs.
"How It Works—PLNAR—The Digital Desk Platform—Enabling virtual and self-service interior property claims.", https://web.archive.org/web/20200815054900/https://plnar.ai/how-it-works/, Aug. 15, 2020, 7 pgs.
"Matterport—3D Capture Platform For Real Estate", https://web.archive.org/web/20200425081326/https://matterport.com/, Apr. 25, 2020, 5 pgs.
"Pixel Level Domain Transfer", GitHub—arxiv.org/abs/1603.07442, Nov. 1, 2017, 3 pgs.
"PLAR SNAP", https://apps.apple.com/us/app/plnar-snap/id1469153858, 2019, 3 pgs.
"PLNAR—By Smart Picture", https://appadvice.com/app/plnar/1282049921, Jul. 30, 2019, 6 pgs.
"PLNAR—CNET", https://download.cnet.com/PLNAR/3000-2094_4-78334973.html, Nov. 28, 2019, 7 pgs.
"PLNAR—Intelligent Enterprises", https://web.archive.org/web/20191216115053/https://plnar.ai/, Apr. 22, 2019, 7 pgs.
"PLNAR—The Digital Desk Platform (Landscape Orientation)", https://web.archive.org/web/20191216115053/https://plnar.ai/, Dec. 16, 2019, 7 pgs.
"PLNAR—The Digital Desk Platform (Portrait Orientation)-", https://web.archive.org/web/20191216115053/https://plnar.ai/, Dec. 16, 2019, 6 pgs.
"PLNAR Digital Desk Overview", www.plnar.ai, 2019, 8 pgs.
"PLNAR SNAP—iOS App Store", https://apps.apple.com/us/app/plnar-snap/id1469153858, Sep. 1, 2019, 1 pg.
"PLNAR—The AR 3D Measuring / Modeling Platform—Create accurate floor plans directly with your phone", https://web.archive.org/web/20190610021130/https://plnar.co/, Jun. 10, 2019, 8 pgs.
"PLNAR Unveils First Measure-Ready Photo Technology", https://www.globenewswire.com/en/news-release/2019/08/21/1905003/0/en/PLNAR-Unveils-First-Measure-Ready-Photo-Technology.html, Aug. 21, 2019, 3 pgs.
"Unlock the Power of AI for Digital Measurement", https://plnar.ai/, 2021, 8 pgs.
"Wikipedia, Digital Twin", https://en.wikipedia.org/wiki/Digital_twin#The_characteristics_of_digital_twin_technology, Nov. 27, 2019, 12 pages.
"YouTube—IKEA Furniture Placement", https://youtu.be/uaxtLru4-Vw, Jul. 26, 2013, 1 pg.
Carlton, Bobby, "Ditch the Tape Measure", https://vrscout.com/news/plnar-ar-floor-plans/, Sep. 23, 2017, 5 pgs.
Choi, et al., "StarGAN: Unified Generative Adversarial Networks for Multi-Domain Image-to-Image Translation", arXiv:1711.09020v3 [cs.CV] Sep. 21, 2018, Sep. 21, 2018, 15 pgs.
Hui, Jonathan, "GAN—Some cool applications of GAN", https://medium.com/@jonathan_hui/gan-some-cool-applications-of-gans-4c9ecca35900, Jun. 22, 2018, 31.
Kaist, et al., "Pixel-Level Domain Transfer", arXiv:1603.07442v3 [cs.CV] Nov. 28, 2016, Nov. 28, 2016, 17 pages.
Ledig, et al., "Photo-Realistic Single Image Super-Resolution Using a Generative Adversarial Network", arXiv:1609.04802v5 [cs.CV] May 25, 2017, May 25, 2017, 19 pgs.
Mendez, Marisa, "Launch Your Measurements Process Into the AR World", https://www.remodeling.hw.net/products/technology/launch-your-measurements-process-into-the-ar-world_o, Jan. 26, 2018, 6.
Phalen, Nicole, "Designing offices with machine learning", https://www.wework.com/ideas/research-insights/designing-with-machine-learning, Nov. 9, 2016, 8 pgs.

* cited by examiner

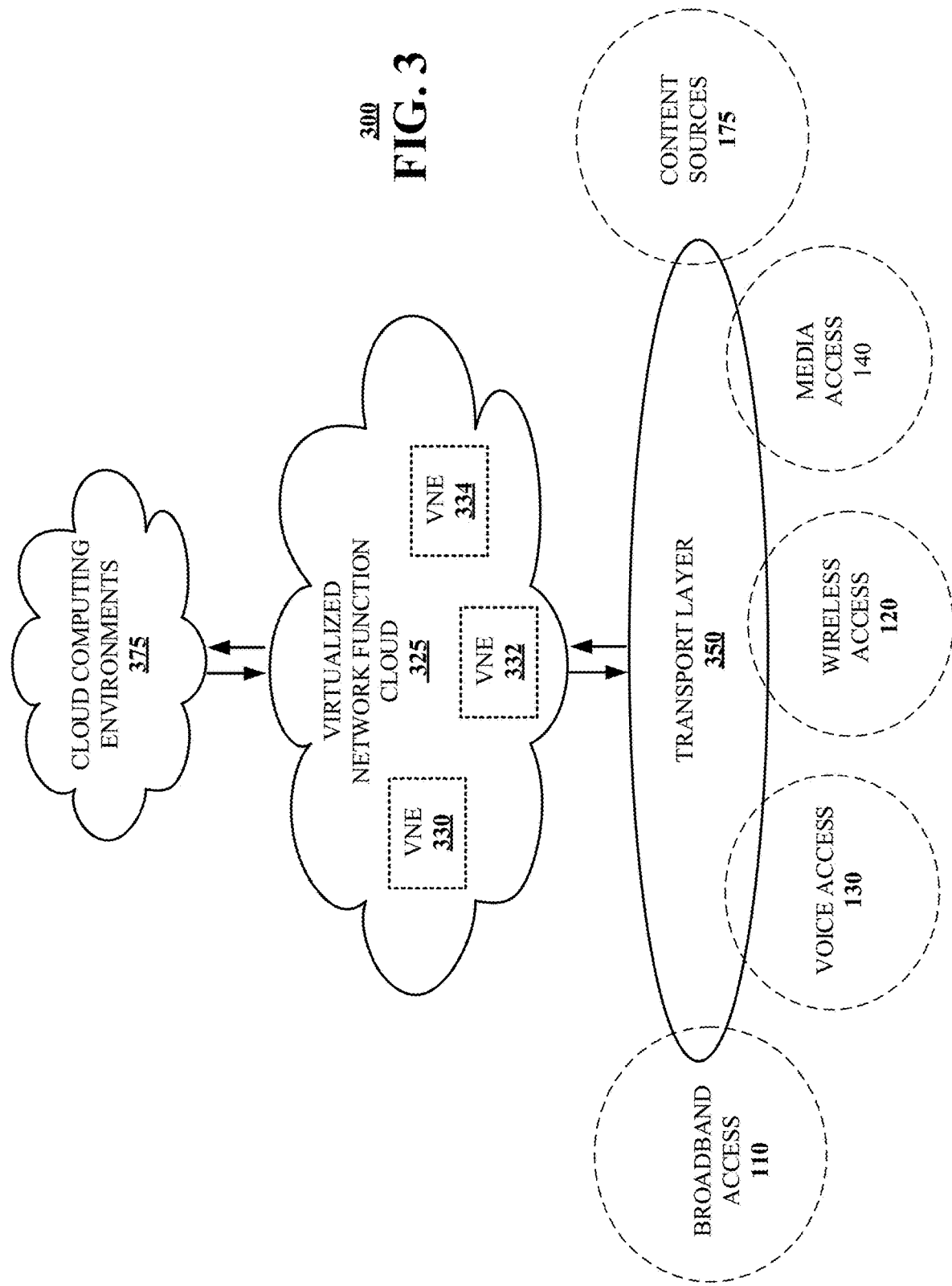

SYSTEMS AND METHODS FOR SPATIAL REMODELING IN EXTENDED REALITY

FIELD OF THE DISCLOSURE

The subject disclosure relates to systems and methods for spatial remodeling in extended reality (sometimes referred to herein as "XR")

BACKGROUND

Remodeling design is often costly and time consuming. Delays are often introduced when the customer (e.g., homeowner) must interact with designers that come to the home for survey, go to design, create blueprints, etc. Additionally, there are often gaps between the space, its blueprints, and the needs or preferences of the customer that could incur additional costs when incorporated.

Further, customers are often absent from the design process: both in the proposal of a specific style (the customer often cannot provide examples or specific instances) and in the modification of the plans proposed by a designer (the customer often cannot express simple movement of a wall (or spatial discomfort) with words alone to achieve the desired effect).

Further still, while certain conventional machine learning techniques could learn the styles of a user, conventional machine learning techniques are not typically incorporated in the design process and instead may recommend only high-level preferences, colors, etc.

Finally, while the availability of certain conventional XR technology could allow for the visualization of changes for wall color and furniture, such conventional XR technology typically lacks the complexity and understanding to accomplish a full remodel proposal.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for learning of customer preferences (e.g., styles) in order to enable visualization of construction projects (e.g., remodeling). Other embodiments are described in the subject disclosure.

One or more aspects of the subject disclosure include an interactive XR system enabled by a machine learning model that allows for modularity around customizing visual displays to best meet a customer's preferences (e.g., construction preferences, marketing preferences). As used herein, extended reality (or "XR") includes augmented reality (sometimes referred to herein as "AR") and virtual reality (sometimes referred to herein as "VR").

One or more aspects of the subject disclosure include XR visualization of a remodeling proposal in existing architecture with knowledge of individual rooms and whole-home revisions—allowing a user (e.g., homeowner) to change specific details and/or furniture within.

One or more aspects of the subject disclosure include inference of a user's home style (e.g., for remodeling, to match a specific era, etc.) from a set of pictures, visited websites, CAD 2D drawings, CAD 3D models, volumetric video, three dimensional point cloud models, polygonal meshes, level sets, and/or computer-aided design (CAD) models, etc.

One or more aspects of the subject disclosure include 2D and/or 3D generative models, e.g., 2D-GAN and/or 3D-GAN (generative adversarial network), for fast remodeling synthesis based on scanning of current room and design preference (e.g. styles). The GAN models and/or suggestions can follow, for example, constraints of existing house framework. In one example, mechanisms can allow interactive user modifications to be quickly observed and/or incorporated in the generation of a new design without costly remodeling, without human proposal and without drafting, etc.

Figure 1:
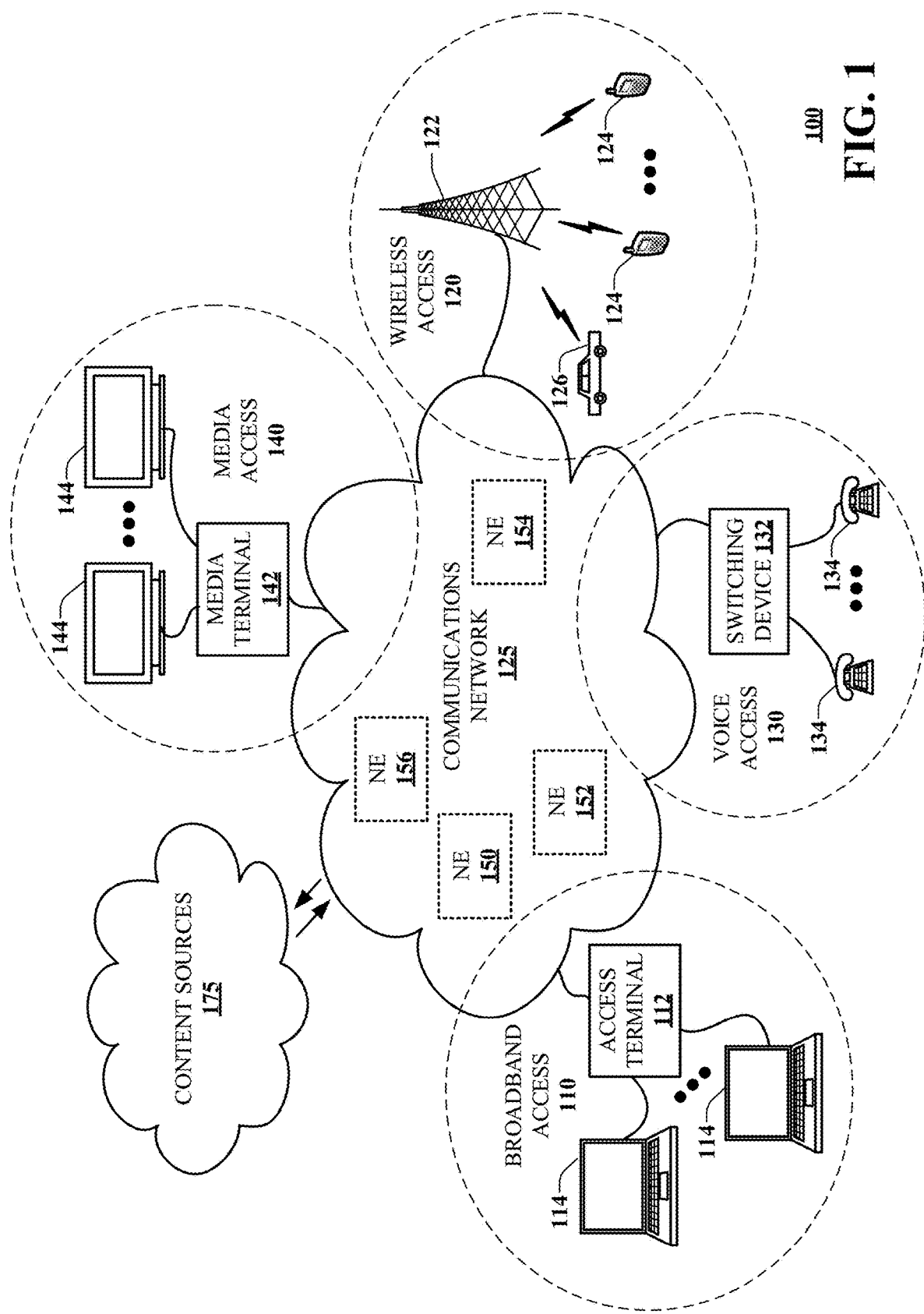
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. For example, communication network 100 can facilitate in whole or in part image collection, machine learning, construction (e.g., remodeling) visualization, and vendor product advertising as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, Ultra-wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without set top boxes, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
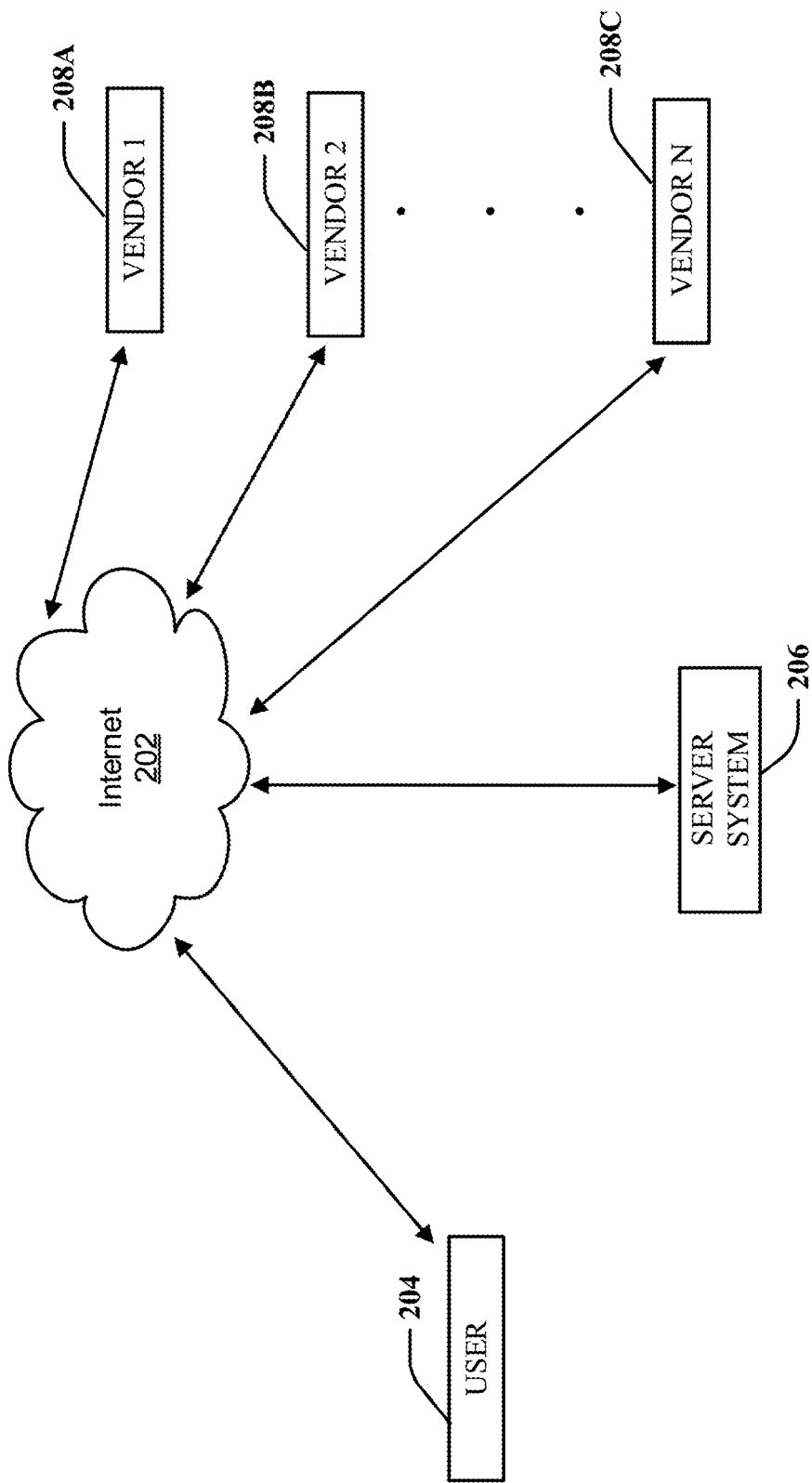
FIG. 2A is a block diagram illustrating an example, non-limiting embodiment of a system that can function (fully or partially) within the communication network of FIG. 1 in accordance with various aspects described herein.

Referring now to FIG. 2A, this is a block diagram illustrating an example, non-limiting embodiment of a system 200 that can function (fully or partially) within the communication network of FIG. 1 in accordance with various aspects described herein.

As seen in this FIG. 2A, this example depicts one user (User 204). Of course, the one user depicted is an example only, and any desired number of users may utilize the system as described herein. In one specific example, User 204 uses a computer (e.g., desktop computer or laptop computer), a tablet or a smartphone to engage in bi-directional communication (via Internet 202) with Server System 206.

Still referring to FIG. 2A, this example depicts three vendors (Vendor 1—208A; Vendor 2—208B; Vendor N—208C). Of course, the three vendors depicted are examples only, and any desired number of vendors may utilize the system as described herein. In one specific example: Vendor 1—208A uses a computer (e.g., a server) to engage in bi-directional communication (via Internet 202) with Server System 206; Vendor 2—208B uses a computer (e.g., a server) to engage in bi-directional communication (via Internet 202) with Server System 206; and Vendor N—208C uses a computer (e.g., a server) to engage in bi-directional communication (via Internet 202) with Server System 206.

Still referring to FIG. 2A, this example depicts Server System 206. This Server System 206 can operate to provide various functionality as described herein (e.g., some or all of the functionality discussed with reference to FIG. 2B). In one specific example, Server System 206 can provide the functionality of Geometry Understanding 256, Preference Adaptation 258 and/or of Structure Synthesis 260 of FIG. 2B (discussed below).

Figure 2B:
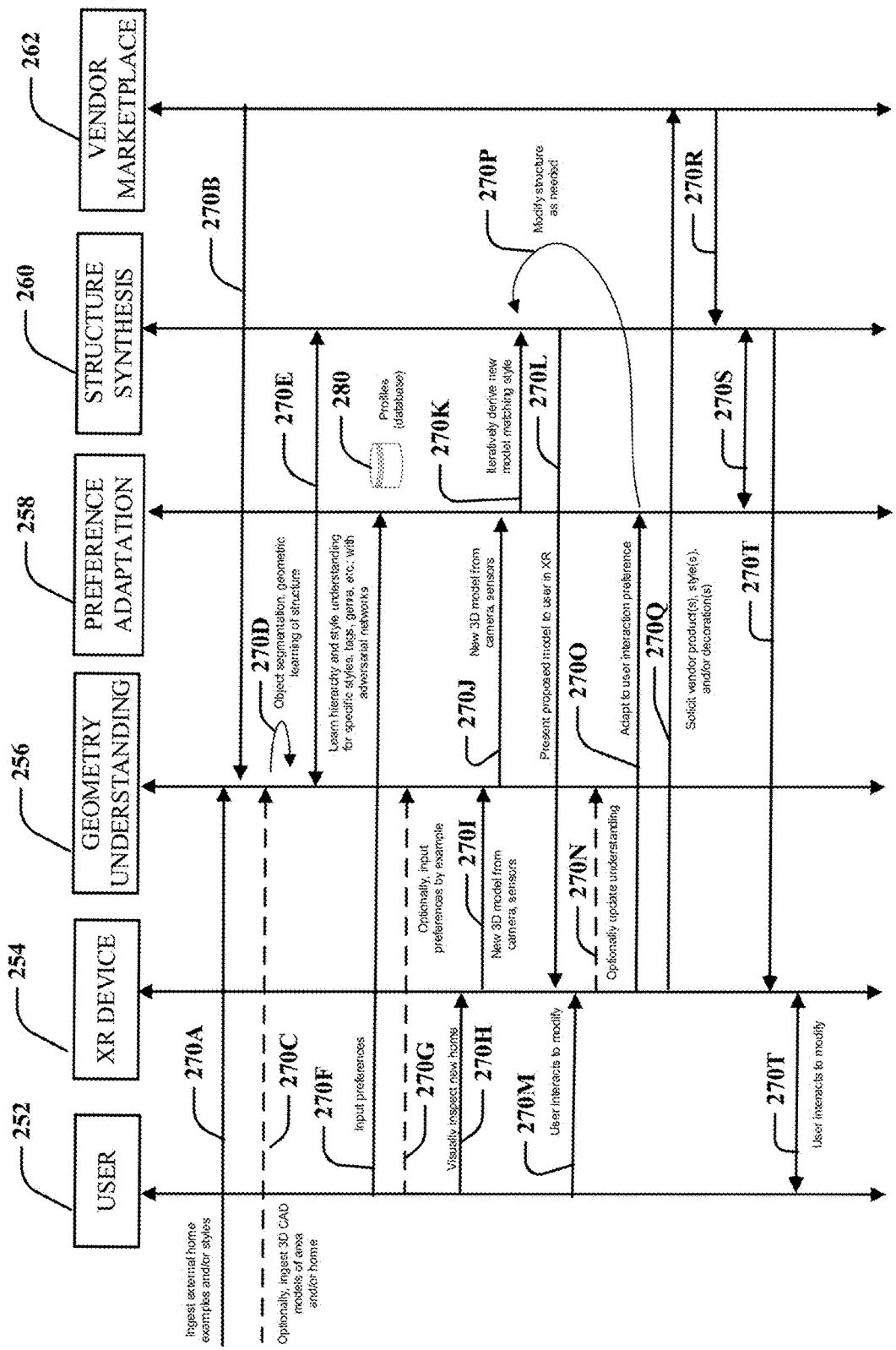
FIG. 2B is a block diagram illustrating an example, non-limiting embodiment of a system that can function (fully or partially) within the communication network of FIG. 1 in accordance with various aspects described herein.

Referring now to FIG. 2B, this is a block diagram illustrating an example, non-limiting embodiment of a system 250 that can function (fully or partially) within the communication network of FIG. 1 in accordance with various aspects described herein.

As seen in this FIG. 2B, system 250 can include XR Device 254 (which can be used by User 252 (e.g., a person whose home is being (or is to be) remodeled). The XR Device 254 can be, for example, an augmented reality device or a virtual reality device. A mechanism (e.g., a computer, a server) for performing Geometry Understanding 256 can ingest external home examples and/or styles (see arrow 270A). In one example, the Geometry Understanding 256 can operate on an exterior of a building and/or operate on an interior (e.g., inside room) of a building. Further, a mechanism (e.g., a computer, a server) for facilitating a Vendor Marketplace 262 can communicate with Geometry Understanding 256 (see arrow 270B). In one example the Vendor Marketplace 262 can comprise product offerings (e.g., furniture and/or accessories) from a plurality of different vendors. In another example, the Vendor Marketplace 262 can comprise a plurality of websites. Further still, Geometry Understanding 256 can ingest 3D CAD models of area and/or building (e.g., home interior, home exterior) (see arrow 270C—shown in this example as an optional dashed line). Further still, object segmentation and geometric learning of structure can be performed by Geometry Understanding 256 (see arrow 270D). Further still, Geometry Understanding 256 can communicate (see double-ended arrow 270E) with a mechanism (e.g., a computer, a server) for performing Structure Synthesis 260 to learn hierarchy and style understanding for specific styles, tags, genres, etc. (via use of adversarial networks). In this regard, see also connection of arrow 270E with a mechanism (e.g., a computer, a server) for performing Preference Adaptation 258. In one example, the Structure Synthesis 260 can operate on 2D and/or 3D floor plans or the like. In another example, the Preference Adaptation 258 can utilize a GAN or the like.

Still referring to FIG. 2B, User 252 can provide (see arrow 270F) input preferences to Preference Adaptation 258 (such user preferences can be stored, for example in a profiles database 280. Such a profiles database 280 can store user profiles for a plurality of different users. Further, User 252 can input preferences by example to Geometry Understanding 256 (see arrow 270G—shown in this example as an optional dashed line). Further still, User 252 can visually inspect a room, building, home, or the like via use of XR Device 254 (see arrow 270H). Further still, XR Device 254 can communicate with Geometry Understanding 256 (see arrow 270I) to facilitate generation of a new 3D model from camera, sensors, or the like. Further still, Geometry Understanding 256 can communicate with Preference Adaptation 258 (see arrow 270J) to facilitate generation of the new 3D model from camera, sensors, or the like. Further still, Preference Adaptation 258 can communicate with Structure Synthesis 260 to iteratively derive new model matching style (see arrow 270K).

Still referring to FIG. 2B, Structure Synthesis 260 can present a proposed model to the User 252 in XR (see arrow 270L pointing to XR Device 254). Further, User 252 can interact with the proposed model (to modify the proposed model) via XR Device 254 (see arrow 270M). Further still, User 252 can update understanding via XR Device 254 (see arrow 270N—shown in this example as an optional dashed line). Further still, the Preference Adaptation 258 can adapt to user interaction preference (see arrow 270O). Further still, the structure can be modified as needed (see arrow 270P). In one example, there can be one, two, or any desired number of such iterations.

Still referring to FIG. 2B, User 252 can (via XR Device 254) solicit vendor product(s), style(s), and/or decoration(s) (see arrow 270Q). One or more responses from Vendor Marketplace 262 can be sent to User 252 via XR Device 254 (see arrows 270R, 270S, 270T). Further still, User 252 can (via XR Device 254) interact to modify (see double-ended arrow 270T). In one example, the view that User 252 sees can be modified iteratively one, two, or any desired number of times (e.g., to iteratively see different products).

Reference will now be made to an additional discussion of operation of a system according to an embodiment. In this embodiment, the system can be trained for objects (e.g., furniture, finishes, appliance, etc.) and houses. A mechanism, see, e.g., Geometry Understanding 256 of FIG. 2B, can ingest many 3D model and geometry examples from direct scans and/or from architecture plans (see, e.g., arrow 270A of FIG. 2B). In one example, labels and tags can be associated with these models. In another example, 3D point cloud information can also be used directly (and/or is merged into physical volumes). In another example, the tags can optionally also describe specific furniture and colors within the model. In addition, the system can extract cues (e.g., geometric objects and configurations) via clustering and/or learning a specific tag through supervised learning, clustering, and/or GAN (see, e.g., Preference Adaptation 258 of FIG. 2B). In addition, going from specific learned tags, the system can promote into a hierarchy describing styles, genre, etc.

Still referring to the additional discussion of the operation of the system according to an embodiment, the system can receive preference inputs from user (see, e.g., Profiles 280 of FIG. 2B). These profiles can be stored, for example, in a database. In one example, the system can utilize explicit feedback from description (e.g., semantic and vocal description of different components). In addition, a break down by object and location through identification can be implemented. In addition (or alternatively), the system can show "like" or preference for seen properties from geo tracking and/or from clicking on a browser. In addition, a user can optionally bootstrap preferences with gestures (e.g., relative sizes, etc.). In another embodiment, implicit feedback can be based on historical living and/or visited locations. In addition, social similarity (e.g., friends) and/or understanding of environment that you've taken pictures of can optionally be implemented. In addition, the system can optionally be used to locally move objects, visual appearance of room, etc. without actual 3D wall modifications. In addition, a user could optionally input a cost limit which can restrict generated model specification and/or revisions.

Still referring to the additional discussion of the operation of the system according to an embodiment, the system can receive input of a user's target environment to remodel. In one example, a model can either come from fixed CAD model or on-site SLAM (Simultaneous Localization and Mapping) for geometry scanning and object detection. In addition, multiple rooms can optionally be integrated for a more cohesive (whole home remodel) model.

Still referring to the additional discussion of the operation of the system according to an embodiment, the system can provide synthesis with a user's preferred remodel with interaction. In one example, a mechanism can enable a user to interact with gestures and/or speech to remodel the components and explicitly trigger different regeneration components. In addition, the more a user interacts with the system, the more the system can assume what components the user wants to run automatically (and/or have those components ingested into the profile). In addition, a user can use gesture plus XR (e.g., augmented reality and/or virtual reality) to understand which wall or limited set of geometry to change (e.g. virtual line drawing, rotation, zooming, gazing, etc.).

Still referring to the additional discussion of the operation of the system according to an embodiment, the system can provide a mechanism to swap in with different vendors' styles. For example, specific teams and preference for a vendor's contribution. In another example, competitive analysis can be performed of different price structures (e.g., good, better, best) to render appearance through vendor catalog.

Figure 2C:
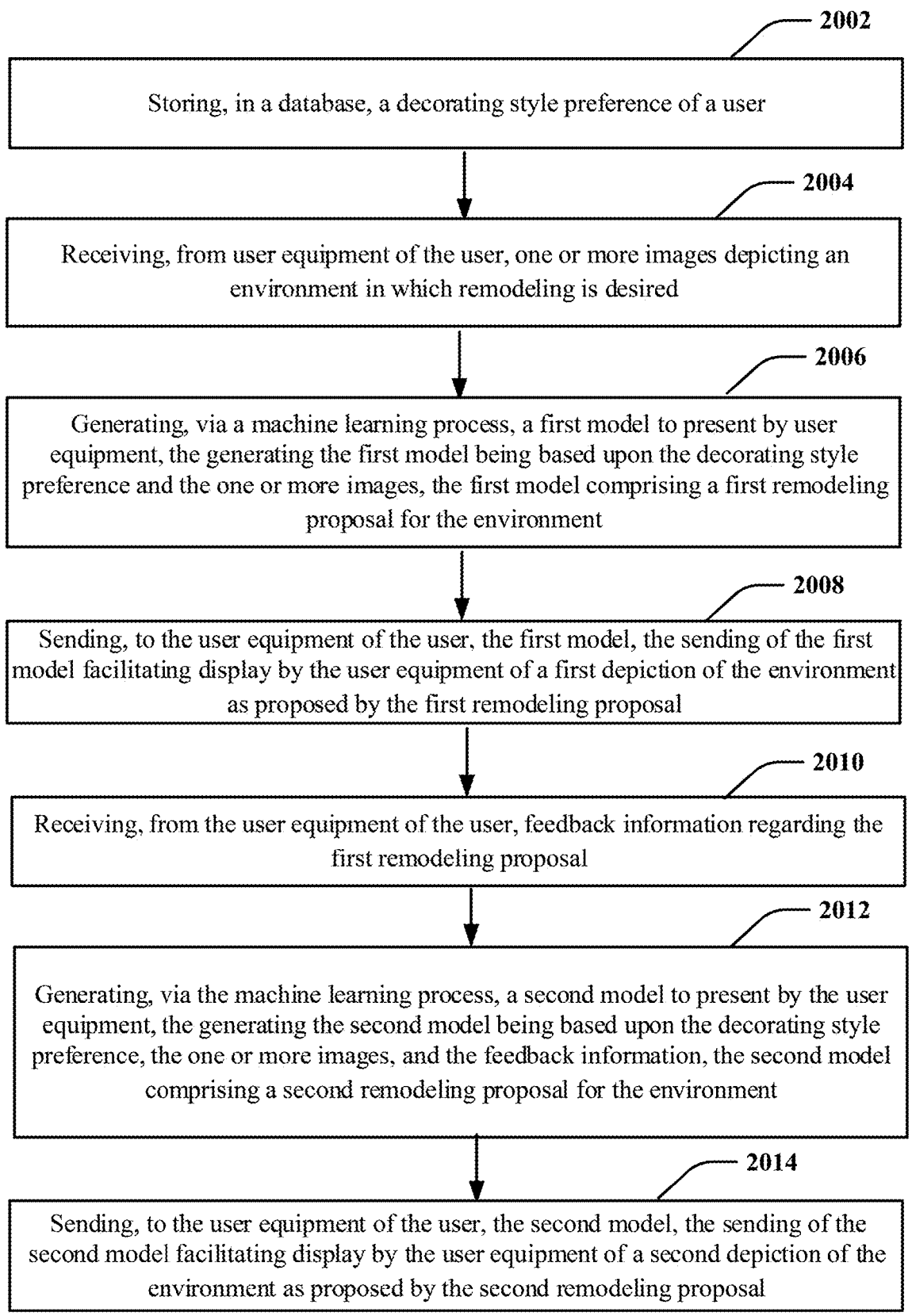
FIG. 2C depicts an illustrative embodiment of a method in accordance with various aspects described herein.

Referring now to FIG. 2C, various steps of a method 2000 according to an embodiment are shown. As seen in this FIG. 2C, step 2002 comprises storing, in a database, a decorating style preference of a user. Next, step 2004 comprises receiving, from user equipment of the user, one or more images depicting an environment in which remodeling is desired. Next, step 2006 comprises generating, via a machine learning process, a first model to present by the user equipment, the generating the first model being based upon the decorating style preference and the one or more images, the first model comprising a first remodeling proposal for the environment. Next, step 2008 comprises sending, to the user equipment, the first model, the sending of the first model facilitating display by the equipment of a first depiction of the environment as proposed by the first remodeling proposal. Next, step 2010 comprises receiving, from the user equipment, feedback information regarding the first remodeling proposal. Next, step 2012 comprises generating, via the machine learning process, a second model to present by the user equipment, the generating the second model being based upon the decorating style preference, the one or more images, and the feedback information, the second model comprising a second remodeling proposal for the environment. Next, step 2014 comprises sending, to the user equipment, the second model, the sending of the second model facilitating display by the user equipment of a second depiction of the environment as proposed by the second remodeling proposal.

In various examples, the decorating style preference of a user can comprise: one or more high-level textual/conceptual descriptions (e.g. pre-existing labels from a taxonomy of visual descriptors, such as "beach", "mountain", "forest"), one or more example photos, one or more pieces of signature furniture, one or more lighting pieces, one or more architecture elements, one or more specific features and/or characteristics (e.g. colors, furnishings, geometry, materials, etc.).

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
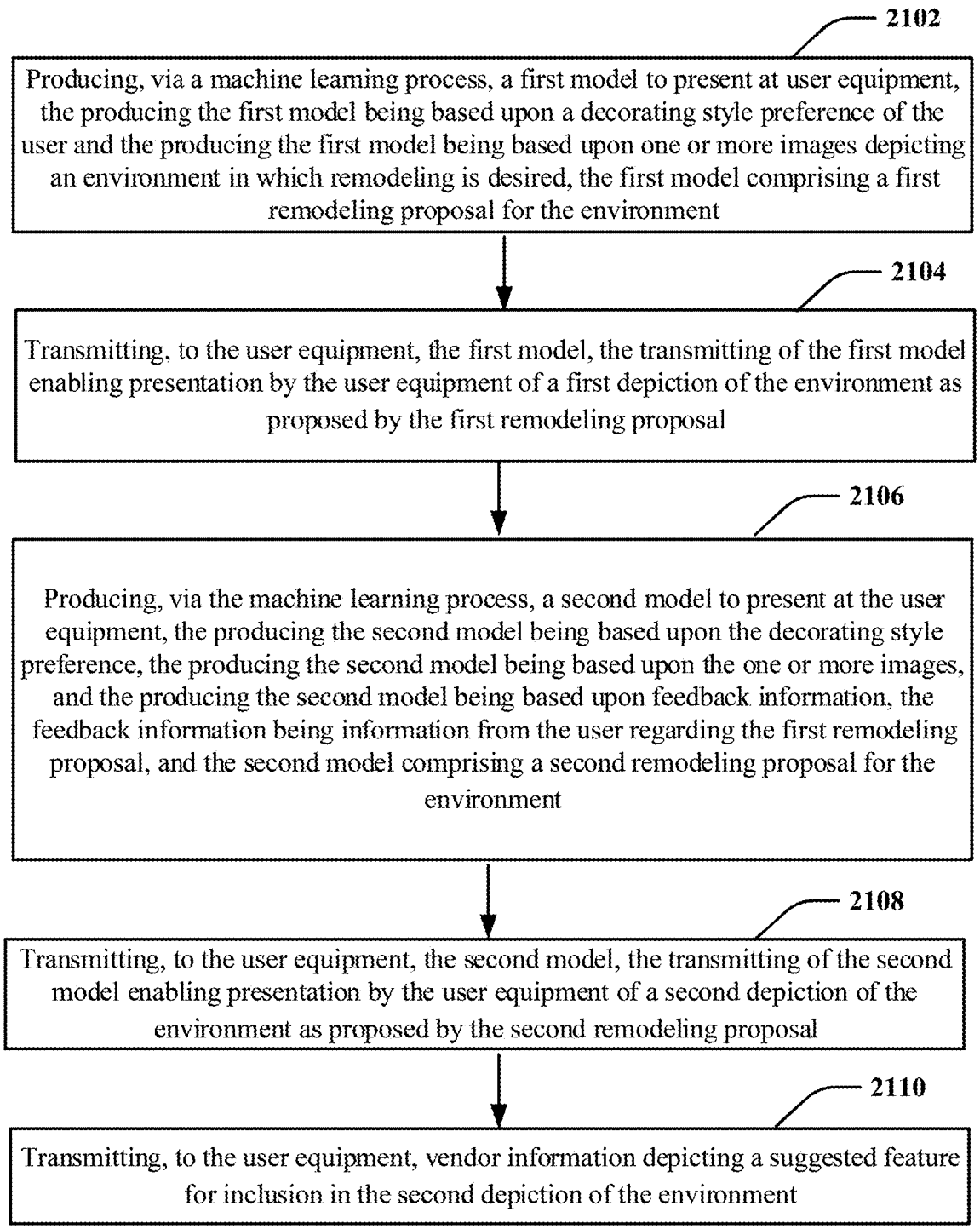
FIG. 2D depicts an illustrative embodiment of a method in accordance with various aspects described herein.

Referring now to FIG. 2D, various steps of a method 2100 according to an embodiment are shown. As seen in this FIG. 2D, step 2102 comprises producing, via a machine learning process, a first model to present at user equipment of a user, the producing the first model being based upon a decorating style preference of the user and the producing the first model being based upon one or more images depicting an environment in which remodeling is desired, the first model comprising a first remodeling proposal for the environment. Next, step 2104 comprises transmitting, to the user equipment, the first model, the transmitting of the first model enabling presentation by the user equipment of a first depiction of the environment as proposed by the first remodeling proposal. Next, step 2106 comprises producing, via the machine learning process, a second model to present at the user equipment, the producing the second model being based upon the decorating style preference, the producing the second model being based upon the one or more images, and the producing the second model being based upon feedback information, the feedback information being information from the user regarding the first remodeling proposal, and the second model comprising a second remodeling proposal for the environment. Next, step 2108 comprises transmitting, to the user equipment, the second model, the transmitting of the second model enabling presentation by the user equipment of a second depiction of the environment as proposed by the second remodeling proposal. Next, step 2110 comprises transmitting, to the user equipment, vendor information depicting a suggested feature for inclusion in the second depiction of the environment.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
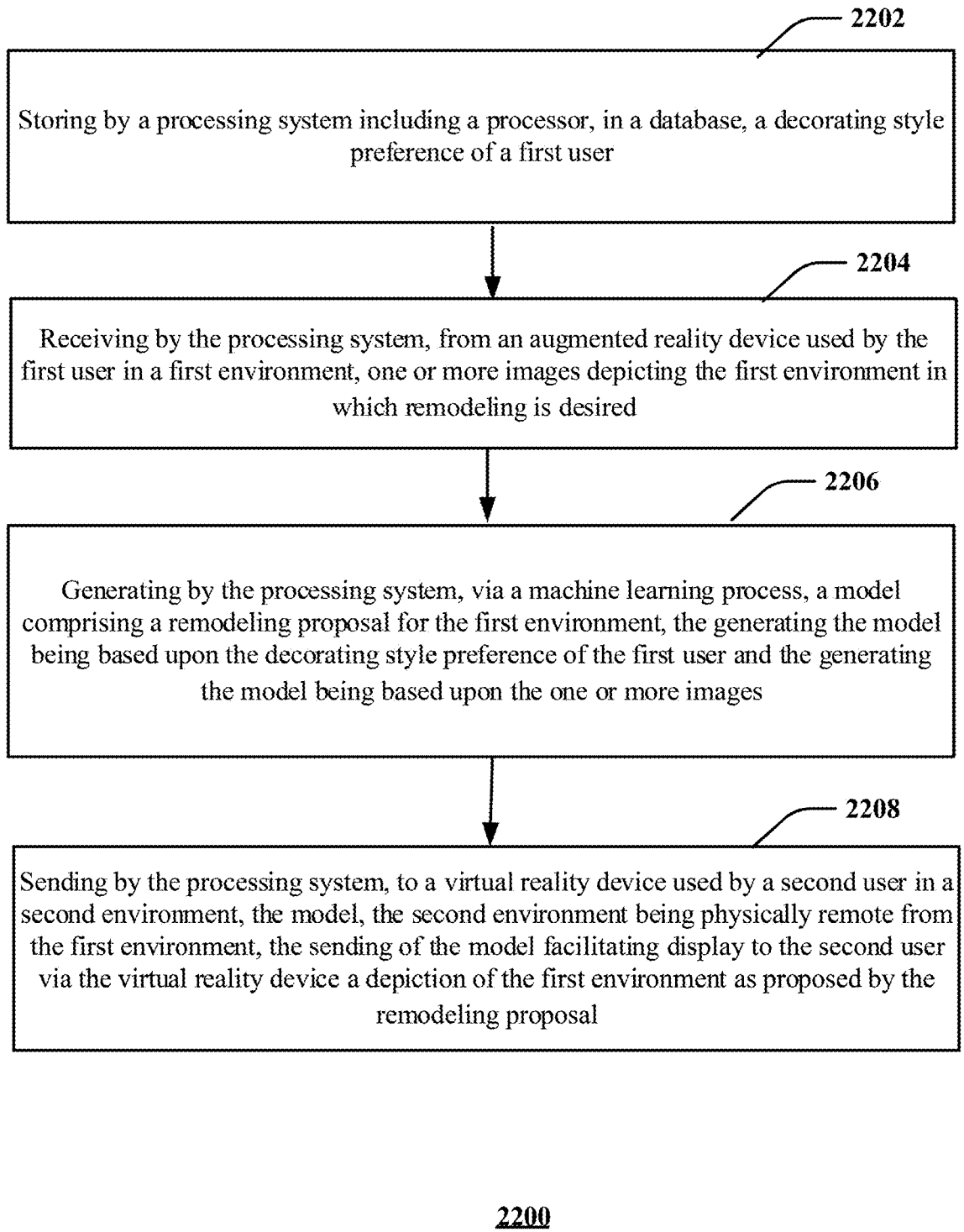
FIG. 2E depicts an illustrative embodiment of a method in accordance with various aspects described herein.

Referring now to FIG. 2E, various steps of a method 2200 according to an embodiment are shown. As seen in this FIG. 2E, step 2202 comprises storing by a processing system including a processor, in a database, a decorating style preference of a first user. Next, step 2204 comprises receiving by the processing system, from an augmented reality device used by the first user in a first environment, one or more images depicting the first environment in which remodeling is desired. Next, step 2206 comprises generating by the processing system, via a machine learning process, a model comprising a remodeling proposal for the first environment, the generating the model being based upon the decorating style preference of the first user and the generating the model being based upon the one or more images. Next, step 2208 comprises sending by the processing system, to a virtual reality device used by a second user in a second environment, the model, the second environment being physically remote from the first environment, the sending of the model facilitating display to the second user via the virtual reality device a depiction of the first environment as proposed by the remodeling proposal.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide systems and methods for spatial remodeling (e.g., real-time spatial remodeling) in extended reality.

As described herein, various embodiments can utilize machine learning techniques to learn the styles of a user, wherein such learned styles are not otherwise incorporated in the design process.

As described herein, various embodiments can utilize XR technology to enable the visualization of changes (e.g., for wall color and furniture) while also providing the complexity and understanding to accomplish a full remodel proposal.

As described herein, various embodiments can provide instant (or nearly instant) review of remodeling plans and visualization of such remodeling plans via XR mechanism(s). In one example, such review and visualization via XR can be instead of conventional time-consuming inspect, design, review with human or architecture.

As described herein, various embodiments can provide model-generated plans (such model-generated plans can be provided, for example, via machine learning). In one example, the user can quickly modulate (that is, modify) the plans with a single mouse (or touchscreen) click (e.g., randomly seed model with a click and get an entirely new design). In another example, the modified plans would still be under strict adherence with existing learned models.

As described herein, various embodiments can provide for visiting (that is, viewing) a plan from an AR-constructed environment via use of a VR mechanism in an off-site location (e.g., someone locally first helps to design and interact with a physical environment, thereby creating an AR-environment; subsequently, the AR-environment (or model) is then conveyed to a VR mechanism (thereby allowing remote remodeling review).

As described herein, various embodiments can use a machine-learned model (e.g., GAN) to quickly propose 3D models and modifications of an existing architecture based on randomized seed to give dramatically different proposals.

As described herein, various embodiments can provide real-time interaction with one or more users for design instruction. In one example, this can be implemented using an understanding of 3D objects, remodeling steps, and constraints of the environment.

As described herein, various embodiments can provide automatic derivation of visual and gesture compatible language for manipulation of 3D objects (e.g., stack two walls that are four feet tall) and higher-level semantic understanding of artistic styles (e.g. make this room Victorian).

As described herein, various embodiments can apply computer vision for image understanding of 3D models and objects in a 2D picture that can be mapped to a known visual design style or object set (e.g., furniture, ornaments in home, etc.). In one example, parameterized input (e.g., continuous values between high-level thematic templates like Victorian, Modern, and Ranch) can be simultaneously evaluated for different appearances.

As described herein, various embodiments can help to derive style patterns that can be utilized for remodeling ideas. Such style patterns can be derived (with image understanding) from implicit input from images collected from social circles (e.g., friends, family, etc.).

As described herein, various embodiments can facilitate monetization opportunities for stylized representation of a user home before/during/after remodeling activity (e.g., catalog expansion and linkage to vendors that can demonstrate their product line proactively (e.g., sponsored by X) for XR placement).

As described herein, various embodiments can utilize human activity (e.g., by real estate agents) for input. In one example, a real estate agent would inspect a potential home to collect geometry, build model, and share back to the buying party (e.g., for remote buying).

As described herein, various embodiments can perform "style transfer" (e.g., "style transfer" such as provided by certain conventional ML/GAN techniques). In one specific embodiment, the "style transfer" can be used to understand contents from a picture and push those styles (e.g., objects, colors, etc.) into a design generator engine.

As described herein, various embodiments can provide for a "digital supply chain". For instance, during a remodel (or when the remodel is complete), a user may have designed custom furniture and/or structural components. These custom designed elements can be sent via digital supply chain to vendors for "on-demand" construction and/or delivery.

As described herein, various embodiments can instead of (or in addition to) learning how to remodel a target environment, learn preferences and/or geometrical limitations, and send this information to a vendor to bootstrap a new shopping experience (e.g., which door, window, lamp, TV is too large?).

As described herein, various embodiments can emphasize XR for instant (or near instant) visualization of a different style.

As described herein, various embodiments can focus on proposals for redesign, such as to constrain the visualizations to existing structure (e.g. convert your media room to a telepresence studio, but project different appearances for your desk, TV, windows, etc. to follow the preferred style).

As described herein, various embodiments can provide monetization for companies (e.g., furniture, engineering, and design companies) which could sponsor items within a remodel, create their own set of models (e.g., for a style), and/or quickly interact with users remotely (e.g., where one party is onsite and the other party is offsite making changes).

As described herein, various embodiments can provide a better user experience (e.g., with cost-controlled suggestions that are quickly available and/or with ML models trained from a wider set of styles or examples (instead of a single designer's input)).

As described herein, various embodiments can provide a better user experience (e.g., with fast personalization from historical homes visited, experience with the system (and/or CAD), photo examples from user ideal homes, and/or examples from social circles (e.g., friends' homes, prior positive experiences in other locations).

As described herein, various embodiments can provide visualization aid to home buyers (who traditionally often have trouble seeing beyond the dated appearances and older floor plans of some homes and who traditionally often need a designer's mock-up to fully appreciate the structure possibilities of a home). In various examples, mechanisms are provided to apply home remodeling preferences to houses that are visited in real-time with computer vision and AR.

As described herein, various embodiments can apply home remodeling preferences to houses that are visited (e.g., knowing preference for floor plan, match the physical structure to that existing plan and adapt to visualize what you want). For instance, various embodiments can provide for: enabling ingest, mapping, and synthesis of an ideal structure based on user feedback; system that captures real-time 3D structure of home as user tours the home; system that is given clues for what the room may be (or determines that via classification of objects); system maps to model preferences specified by the user (e.g. they want open-concept kitchen instead of galley); system uses ML (e.g., a GAN) to adapt existing input and structural layout that is preferred (see, e.g., Deepfakes for operation on faces—https://en.wikipedia.org/wiki/Deepfake); system projects AR overlay for one layout preferred by user; and/or system enables functionality wherein the user can swipe or select alternate preferences, which can be quickly regenerated by GAN.

As described herein, various embodiments can provide mechanisms to avoid having to physically visit a location.

As described herein, various embodiments can provide mechanisms that limit the details that need to be conveyed (e.g., by instead providing a summary). For instance, an immersive display could be sufficient to avoid visiting a house.

As described herein, various embodiments can provide mechanisms wherein a user takes a snapshot (photograph) of a place or location for future recollection and review of the house. In one example, a body cam can be used to recognize and reconstruct.

As described herein, various embodiments provide mechanisms that can be used by architects.

As described herein, various embodiments provide mechanisms that can be used in the context of landscaping.

As described herein, various embodiments provide mechanisms that can be used to change environments (e.g., changing a working environment; change a room into a forest (such as via full overlay—AR).

As described herein, various embodiments provide for hypothesizing what can be done.

As described herein, various embodiments provide mechanisms that can apply all style and demographic understanding by the analysis of other personal media (e.g., social media, user-generated content, personal web logs, stories, etc.) into the generation of home preferences.

As described herein, various embodiments provide mechanisms that can suggest specific product placement for a brand (e.g. furniture sponsored by "Company A").

As described herein, various embodiments provide mechanisms wherein style transfer can also be used to match.

As described herein, various embodiments provide mechanisms to facilitate active remodeling based on style and design preferences (e.g., model synthesis).

As described herein, various embodiments provide mechanisms that operate in the context of XR, digital twinning, and/or synthesis of environments with high interaction and personalization by the user.

As described herein, various embodiments provide mechanisms that operate in the context of XR and/or digital twinning for construction.

As described herein, various embodiments can operate by using examples of real objects and real wall structures to train a GAN that generates new examples.

As described herein, various embodiments can operate by creating: (a) a 2D mapping GAN to go from pictures to 3D; (b) a 3D generation GAN to go from examples of 3D building structure to 3D objects that fit; and/or (c) a style GAN that can map from a user's 3D and/or 2D structure to objects that have properties matching the user's preferred style.

As described herein, various embodiments can utilize GAN structure as follows: a generator (G) and discriminator (D) are "adversaries" where the generator tries to explore and exploit weakness of the discriminator, and the discriminator tries to minimize loss (or error from valid examples).

As described herein, various embodiments provide mechanisms to: enable hardware (e.g., user equipment) to receive one or more models (e.g., AR/XR models); and/or enable hardware (e.g., user equipment) to present one or more received models (e.g., one or more received AR/XR models). In various examples, the hardware can comprise a phone, goggles, a holographic display, a volumetric display, or any combination thereof.

Various embodiments can utilize one or more of the types of GANs described in the following references: (a) "https://developers.google.com/machine-learning/gan/applications" (e.g., creating a sketch and mapping it to a real object (image-to-image translation), changing the style of an image between two examples (cyclegan), and converting text into a synthesized object (text-to-image)); (b) https://medium.com/@jonathan hui/gan-some-cool-applications-of-gans-4c9ecca35900.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, some or all of the subsystems and functions of systems 200 and 250, and some or all of methods 2000, 2100 and 2200 presented in FIGS. 1, 2A-E, and 3. For example, virtualized communication network 300 can facilitate in whole or in part image collection, machine learning, construction (e.g., remodeling) visualization, and vendor product advertising as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element is required to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
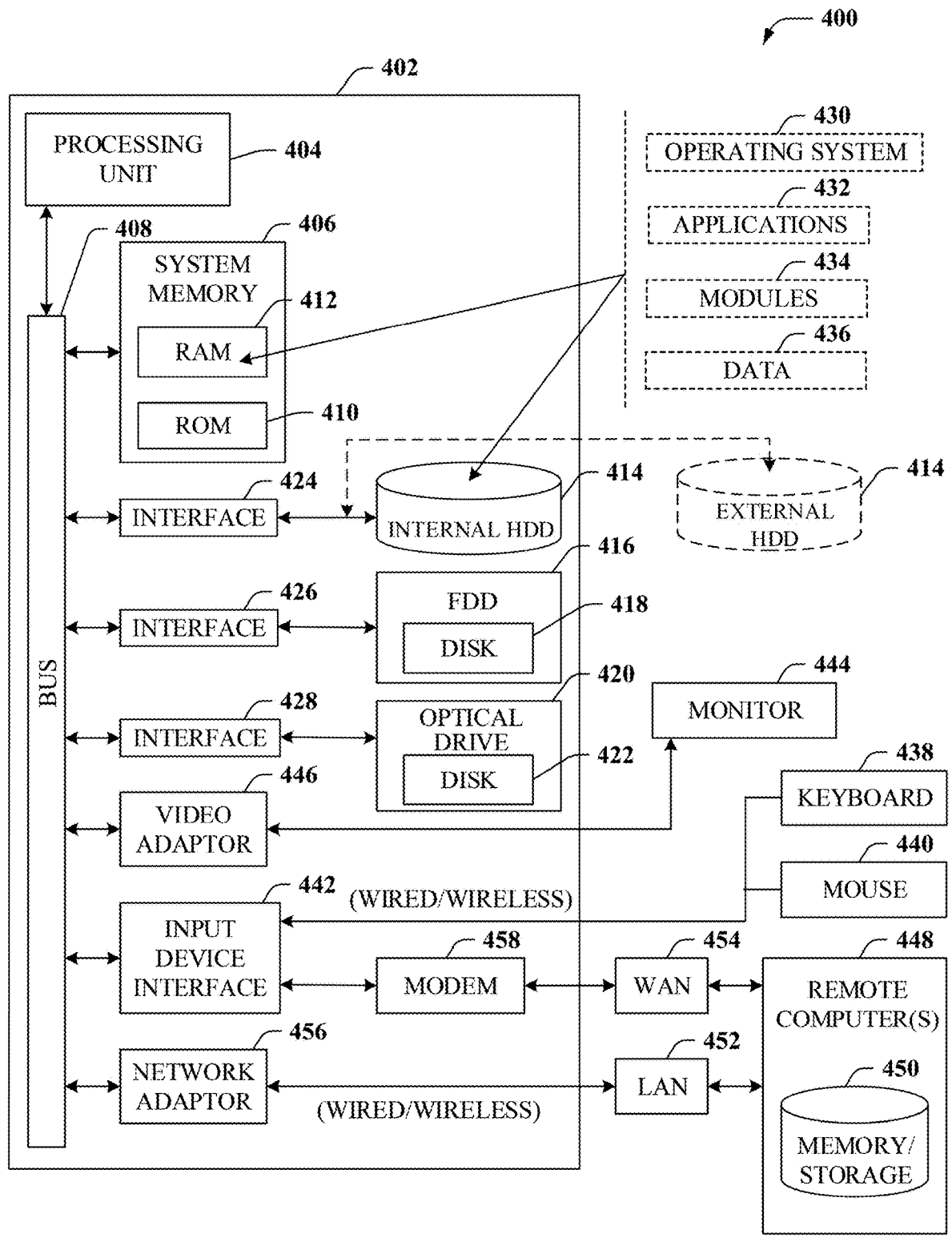
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part image collection, machine learning, construction (e.g., remodeling) visualization, and vendor product advertising as described herein.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
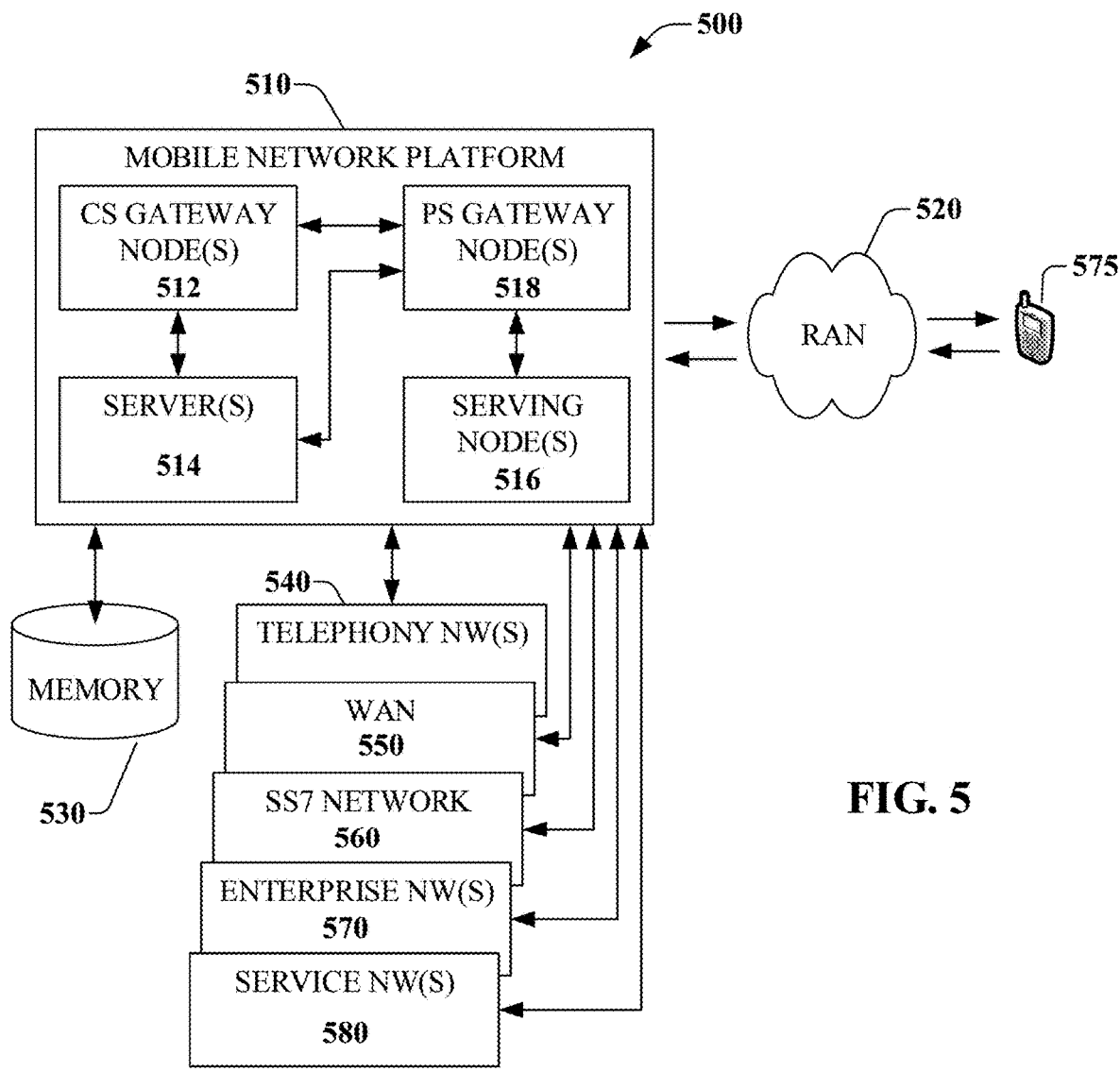
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part image collection, machine learning, construction (e.g., remodeling) visualization, and vendor product advertising as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
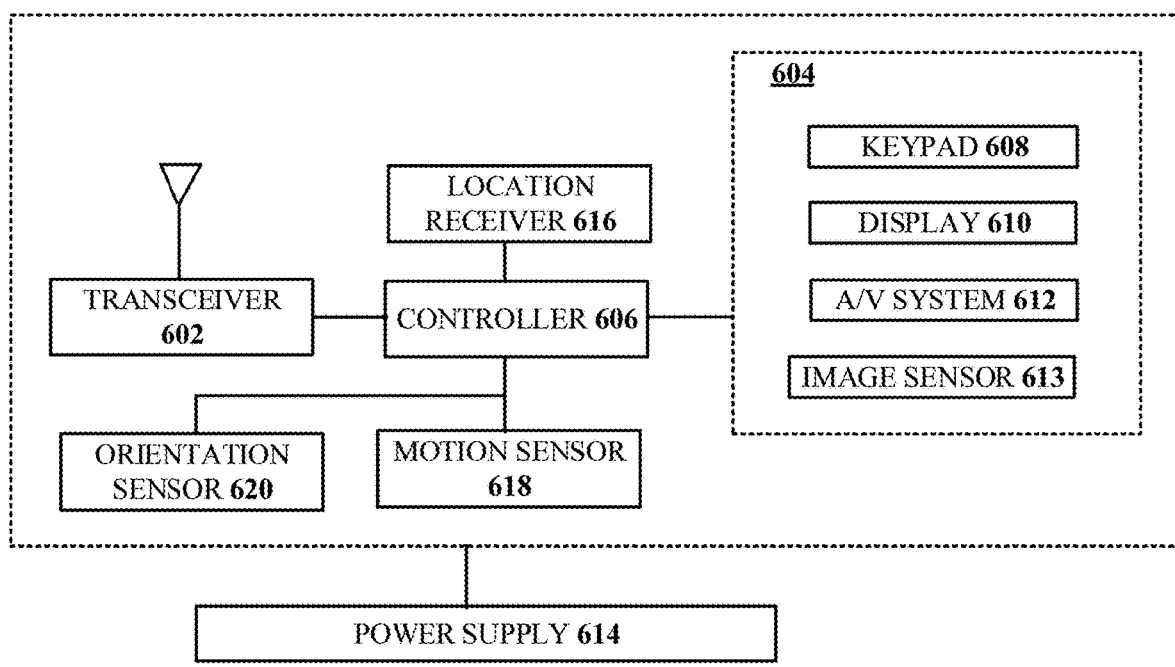
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part image collection, machine learning, construction (e.g., remodeling) visualization, and vendor product advertising as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAIVI), Synchlink DRAM (SL-DRAM), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically providing image collection, machine learning, construction (e.g., remodeling) visualization, and/or vendor product advertising as described herein) can employ various AI-based schemes for carrying out various embodiments thereof. Moreover, the classifier can be employed to determine a ranking or priority of certain metrics. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
storing, in a database, a decorating style preference of a user, the decorating style preference comprising a textual label from a taxonomy of visual descriptors;
receiving, from user equipment of the user, one or more images depicting an environment in which remodeling is desired;
generating, via a machine learning process, a first model to present by the user equipment, the generating the first model being based upon the decorating style preference and the one or more images, the first model comprising a first remodeling proposal for the environment;
sending, to the user equipment, the first model, the sending of the first model facilitating display by the user equipment of a first depiction of the environment as proposed by the first remodeling proposal;
receiving, from the user equipment, feedback information regarding the first remodeling proposal;
generating, via the machine learning process, a second model to present by the user equipment, the generating the second model being based upon the decorating style preference, the one or more images, and the feedback information, the second model comprising a second remodeling proposal for the environment; and
sending, to the user equipment, the second model, the sending of the second model facilitating display by the user equipment of a second depiction of the environment as proposed by the second remodeling proposal.

2. The device of claim 1, wherein the machine learning process comprises a generative adversarial network (GAN).

3. The device of claim 2, wherein the generating the second model comprises utilization of a randomly seeded model.

4. The device of claim 3, wherein the feedback information comprises a single input from the user which causes utilization of the randomly seeded model.

5. The device of claim 1, wherein the one or more images comprises a single image, a plurality of images, a video stream, volumetric video, one or more three dimensional point cloud models, one or more polygonal meshes, one or more level sets, one or more computer-aided design (CAD) models, or any combination thereof.

6. The device of claim 1, wherein the user equipment comprises a camera, a webcam, an augmented reality application, a virtual reality application, a head-mounted device, an eyeglasses device, or any combination thereof.

7. The device of claim 1, wherein:
the decorating style preference comprises a plurality of decorating style preferences;
the operations further comprise receiving from the user the plurality of decorating style preferences;
the generating the first model is based upon the plurality of decorating style preferences; and
the generating the second model is based upon the plurality of decorating style preferences.

8. The device of claim 1, wherein the environment comprises a room in a building, an exterior of a building, or any combination thereof.

9. The device of claim 8, wherein the building comprises a single-family home, a multi-family home, an apartment unit, an apartment building, an office building or any combination thereof.

10. The device of claim 1, wherein:
the first model that is sent to the user equipment comprises first data that facilitates presenting to the user, by the user equipment, the first depiction of the environment as proposed by the first remodeling proposal;
the second model that is sent to the user equipment comprises second data that facilitates presenting to the user, by the user equipment, the second depiction of the environment as proposed by the second remodeling proposal; and
the user equipment comprises a smartphone, goggles, a holographic display, a volumetric display, or any combination thereof.

11. The device of claim 1, wherein:
the first model that is sent to the user equipment comprises a single image, a plurality of images, a video stream, volumetric video, one or more three dimensional point cloud models, one or more polygonal meshes, one or more level sets, one or more computer-aided design (CAD) models, or any combination thereof; and
the second model that is sent to the user equipment comprises a single image, a plurality of images, a video stream, volumetric video, one or more three dimensional point cloud models, one or more polygonal meshes, one or more level sets, one or more CAD models, or any combination thereof.

12. The device of claim 1, wherein the operations further comprise:
sending, to the user equipment, vendor information depicting a suggested feature for inclusion in the second depiction of the environment; and
billing a vendor of the suggested feature responsive to the sending of the vendor information.

13. The device of claim 12, wherein the operations further comprise receiving, from the user equipment, a request for the vendor information, the sending the vendor information to the user equipment being responsive to receipt of the request.

14. A non-transitory machine-readable medium comprising executable instructions that, when executed by a processing system including a processor, facilitate performance of operations, the operations comprising:
producing, via a machine learning process, a first model to present at user equipment of a user, the producing the first model being based upon a decorating style preference of the user, the decorating style preference comprising a textual label from a taxonomy of visual descriptors, the producing the first model further being based upon one or more images depicting an environment in which remodeling is desired, and the first model comprising a first remodeling proposal for the environment;
transmitting, to the user equipment, the first model, the transmitting of the first model enabling presentation by the user equipment of a first depiction of the environment as proposed by the first remodeling proposal;

producing, via the machine learning process, a second model to present at the user equipment, the producing the second model being based upon the decorating style preference, the producing the second model being further based upon the one or more images, and the producing the second model being further based upon feedback information, the feedback information being information from the user regarding the first remodeling proposal, and the second model comprising a second remodeling proposal for the environment;

transmitting, to the user equipment, the second model, the transmitting of the second model enabling presentation by the user equipment of a second depiction of the environment as proposed by the second remodeling proposal; and transmitting, to the user equipment, vendor information depicting a suggested feature for inclusion in the second depiction of the environment.

15. The non-transitory machine-readable medium of claim 14, wherein the suggested feature comprises an item for placement in the environment.

16. The non-transitory machine-readable medium of claim 15, wherein the item comprises a piece of furniture that is offered for sale by a vendor.

17. The non-transitory machine-readable medium of claim 14, wherein the operations further comprise:

receiving, from the user equipment, a request for the vendor information, the transmitting of the vendor information to the user equipment being responsive to receipt of the request;

receiving, from the user, the decorating style preference;

storing, in a database, the decorating style preference that is received;

receiving, from the user equipment, the one or more images depicting the environment in which remodeling is desired; and receiving, from the user equipment, the feedback information regarding the first remodeling proposal.

18. A method, comprising:

storing by a processing system including a processor, in a database, a decorating style preference of a first user, the decorating style preference of the first user comprising a textual label from a taxonomy of visual descriptors;

receiving by the processing system, from an augmented reality device used by the first user in a first environment, one or more images depicting the first environment in which remodeling is desired;

generating by the processing system, via a machine learning process, a model comprising a remodeling proposal for the first environment, the generating the model being based upon the decorating style preference of the first user and the generating the model being based upon the one or more images; and sending by the processing system, to a virtual reality device used by a second user in a second environment, the model, the second environment being physically remote from the first environment, the sending of the model facilitating display to the second user via the virtual reality device of a depiction of the first environment as proposed by the remodeling proposal.

19. The method of claim 18, wherein:

the model that is sent to the virtual reality device comprises data that facilitates presenting to the second user, by the virtual reality device, the depiction of the first environment as proposed by the remodeling proposal.

20. The method of claim 18, wherein:

the model that is sent to the virtual reality device comprises a single image, a plurality of images, a video stream, volumetric video, one or more three dimensional point cloud models, one or more polygonal meshes, one or more level sets, one or more computer-aided design (CAD) models, or any combination thereof.

* * * * *